United States Patent [19]
Wootton et al.

[11] Patent Number: 5,956,424
[45] Date of Patent: Sep. 21, 1999

[54] LOW FALSE ALARM RATE DETECTION FOR A VIDEO IMAGE PROCESSING BASED SECURITY ALARM SYSTEM

[75] Inventors: John R. Wootton, St. Louis; Gregory L. Hobson, St. Charles, both of Mo.

[73] Assignee: Esco Electronics Corporation, St. Louis, Mo.

[21] Appl. No.: 08/772,731

[22] Filed: Dec. 23, 1996

[51] Int. Cl.[6] ............ G06K 9/46; G06K 9/20; H04N 7/18; G08B 13/00

[52] U.S. Cl. .......... 382/192; 382/283; 348/154; 348/155; 340/541

[58] Field of Search .................. 382/283, 100, 382/192, 153; 348/155, 154, 143, 152, 399, 700; 340/541, 555

[56] References Cited

U.S. PATENT DOCUMENTS

| | | | |
|---|---|---|---|
| 3,651,252 | 3/1972 | Land et al. | 348/332 |
| 4,161,750 | 7/1979 | Kamin | 340/541 |
| 4,257,063 | 3/1981 | Loughry et al. | 340/529 |
| 4,342,987 | 8/1982 | Rossin | 340/567 |
| 4,364,030 | 12/1982 | Rossin | 340/567 |
| 4,679,077 | 7/1987 | Yuasa et al. | 358/108 |
| 4,847,485 | 7/1989 | Koelsch | 340/567 |
| 4,903,009 | 2/1990 | D'Ambrosia et al. | 340/556 |
| 4,939,359 | 7/1990 | Freeman | 340/567 |
| 4,949,074 | 8/1990 | D'Ambrosia et al. | 340/541 |
| 4,952,911 | 8/1990 | D'Ambrosia et al. | 340/557 |
| 4,967,183 | 10/1990 | D'Ambrosia et al. | 340/552 |
| 5,091,780 | 2/1992 | Pomerleau | 348/155 |
| 5,101,194 | 3/1992 | Sheffer | 341/567 |
| 5,253,070 | 10/1993 | Hong | 348/155 |
| 5,283,551 | 2/1994 | Guscott | 340/567 |
| 5,289,275 | 2/1994 | Ishii et al. | 348/154 |
| 5,305,390 | 4/1994 | Frey et al. | 382/115 |
| 5,398,057 | 3/1995 | Tapp | 348/154 |
| 5,422,981 | 6/1995 | Niki | 382/159 |
| 5,517,429 | 5/1996 | Harrison | 340/541 |
| 5,576,972 | 11/1996 | Harrison | 702/128 |

OTHER PUBLICATIONS

"Image Processing Method for Intruder Detection around Power Line Towers," Kaneta et al., IEICE Trans. Inf. & Syst., vol. E76–D No. 10, Oct. 1993.

"Digital Image Processing," Gonzalez et al., Addison–Wesley Publishing, Reading, MA (1977).

"A robot working space protection system using visual perception," Amat et al., SPIE vol. 695 Computer Vision for Robots, pp. 136–141 (1985).

"Model–based Vision for Automatic Alarm Interpretation," Ellis et al., Carnahan Conf. on Security Technology, pp. 62–67, (1990).

*Primary Examiner*—David K. Moore
*Assistant Examiner*—Wenpeng Chen
*Attorney, Agent, or Firm*—Polster, Lieder, Woodruff & Lucchesi LC

[57] ABSTRACT

Apparatus (10) and a method for visually monitoring a scene and detecting motion of an intruder within the scene. A camera (C) continually views the scene and produces a representative signal. A processor (12) processes the signal and produces an image (f2) represented by the signal. This image is compared with a similar image (f1) of the scene from a previous point in time. Segments of the later image which differ from segments of the earlier image are identified. A discriminator (14) evaluates these segments to determine if the differences result simply from lighting changes, or the movement of an intruder within the scene. If caused by an intruder, an appropriate indication is provided. An algorithm is employed by which differences from one image to another caused by lighting changes, the effects of motion of objects established within the scene, noise, and aliasing effects are identified so as not to produce false alarms. Those remaining segments are further evaluated to determine if there is an intruder present within the scene.

9 Claims, 4 Drawing Sheets

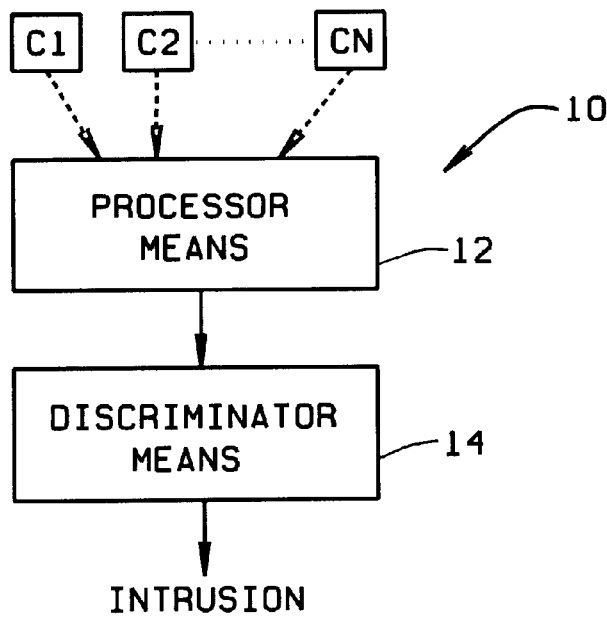
FIG. 1
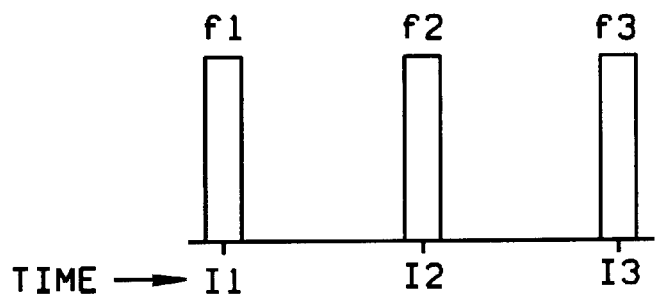
FIG. 6
P1  P2  P3
P4  P   P5
P6  P7  P8
FIG. 7

LOW FALSE ALARM RATE DETECTION FOR A VIDEO IMAGE PROCESSING BASED SECURITY ALARM SYSTEM

CROSS REFERENCE TO RELATED APPLICATIONS

The subject matter contained in this application is related to U.S. patent applications Ser. No. 08/771,991, filed Dec. 23, 1996; and Ser. No. 08/772,595, filed Dec. 23, 1996; and 08/757,838, filed Nov. 27, 1996.

STATEMENT REGARDING FEDERALLY SPONSORED RESEARCH OR DEVELOPMENT

Not Applicable.

BACKGROUND OF THE INVENTION

This invention relates to video security systems and a method for detecting the presence of an intruder into a scene; and more particularly to the discernment of an intruder based upon sensed surface differences which occur within the scene rather than lighting changes which may occur therewithin.

In co-pending, co-assigned U.S. patent application Ser. No. 08/772,595 there is described a video security system and method by which a reference scene is established for comparison with later images of the same scene. These comparisons are made to determine if there are any differences between the scenes. If there are marked differences between the contents of the two images, this is interpreted as an intrusion of some kind having occurred within the scene. A primary function of the system and the method it employs is to identify and classify intruders into a scene and only notify security personnel in the event an intruder is human. All other anomalies which produce a difference between the two images are identified as false alarms for which no notification is given. In the security system as described in co-pending application Ser. No. 08/772,595, the possibility of false alarms caused by lighting changes within a scene, whether natural or manmade, global or local, is addressed. As discussed therein, the differences between the reference scene and a later scene resulting from lighting effects can be now be identified so that no false alarm results from them. However, there are other potential causes of false alarms which also must be recognized. The video security system and image processing methodology as described herein recognizes anomalies resulting from these other causes so these, too, can be accounted for.

Previous attempts have made to provide a reliable security system to detect the presence of a person in a scene using a video system. In U.S. Pat. No. 4,697,097, for example, a reference image of a scene is compared with a subsequent image to detect the presence of an object (an anomaly which may or may not be caused by a human intruder) with the image then being transmitted to another location for review by a human. U.S. Pat. No. 4,257,063, teaches comparing a video line (not a whole image) from a camera with the same video line produced at an earlier time to detect the presence of a human. No compensation is made for light changes, nor is an attempt made to recognize the contents of the image as being a human intruder. Similarly, U.S. Pat. No. 4,161,750, teaches that changes in the average value of a video line can be used to detect the presence of an anomalous object. While this art generally teaches some type of detection, it does not address the use of image processing as an automatic recognition stage to prevent false alarms, nor the use of image processing to distinguish differences between a reference image and a later image for effects such as noise, aliasing, repetitious movements, etc. which can also produce false alarms. This applications describes both recognition of objects due to surface differences which are present between the reference image and a later image against which it is compared, as well as identifying these other sources of potential false alarms.

BRIEF SUMMARY OF THE INVENTION

Among the several objects of the present invention may be noted the provision a video security system and method for visually monitoring a scene and detecting the presence of an intruder within the scene;

the provision of such a system and method to readily distinguish between changes within the scene caused by the presence of a person entering the scene as opposed to changes within the scene resulting from lighting changes and other anomalies which occur within the scene;

the provision of such a system and method which provides an indication to security personnel only when presence of an intruder is sensed, and not to generate false alarms in response to changes only caused by lighting or other sources of anomalies;

the provision of such a system and method which does not produce an intruder indication in response to changes resulting from noise on video lines, aliasing effects, the movement of an oscillating fan or similar types of rotating machinery whose position is generally fixed within a scene, or movement of objects such as drapes caused by air flow through air conditioning and heating vents;

the provision of such a system and method to employ a camera system operating in the visible or infrared portion of the light spectrum;

the provision of such a system and method in which the scene is viewed on a continuous or repetitious basis with a recent image of the scene being compared with a continuously updated reference image of the scene to locate significant differences between the two for possible further processing;

the provision of such a system and method to respond to surface differences which occur in a scene rather than lighting changes which occur therewithin to detect the presence of an intruder in the scene;

the provision of such a system and method to identify those pixel values within a scene which differ from the values of corresponding pixels in the reference scene as an indication of a change within the scene;

the provision of such a system and method to further establish thresholds for changes in pixel values and discriminate between significant and non-significant changes based upon the whether or not any changes exceed threshold levels;

the provision of such a system and method to identify within the scene those areas in which lighting changes may normally occur and to disregard such changes unless image processing indicates further investigation is warranted;

the provision of such a system and method to identify those areas within a scene where fixed objects having an associated detectable motion or lighting change are located and to mask those areas so that during image processing, movements within those areas will be disregarded and not sensed as an anomaly requiring processing to determine if a human intruder is present;

the provision of such a system and method to employ detection, antialiasing, region grower segmentation, noise removal, and masking algorithms to identify anomalies not resulting from the presence of an intruder so to thereby not generate false alarms;

the provision of such a system and method to simultaneously monitor a number of different areas and to process images of scenes from each area to detect intruder presence; and, the provision of such a system and method to quickly and reliably determine the presence of an intruder, and to provide a security system which is economical to use and operate with a minimum of security personnel.

In accordance with the invention, generally stated, a video security system visually monitors a scene to detect motion of an object (a possible intruder) within the scene. A camera continually views the scene and produces a signal representative of the scene. A processor processes the signal to produce an image represented by the signal and compares the image representing the scene at one point in time with a "reference" image of the scene at a previous point in time. Those segments of the image which differ from segments of the reference image are identified. A discriminator evaluates those segments to determine if the differences are caused by lighting changes within the scene, anomalies caused by noise, aliasing effects, movements of objects fixed within the scene, or the movement of an intruder within the scene. If a difference is caused by an intruder, an appropriate indication is provided. The system employs an algorithm by which differences from one image to another caused by lighting changes, the effects of motion of objects established within the scene, noise, and aliasing effects are identified so as not to produce false alarms. A method of intruder detection is also disclosed. Other objects and features will be in part apparent and in part pointed out hereinafter.

BRIEF DESCRIPTION OF THE DRAWINGS

In the drawings,

FIG. 1 is a simplified block diagram of apparatus of the present invention for viewing a scene and determining the presence of an intruder in the scene;

FIG. 6 is a simplified time line indicating intervals at which images of the scene are viewed by the camera system;

FIG. 7 represents a pixel array such as forms a portion of an image; and,

Corresponding reference characters indicate corresponding parts throughout the several views of the drawings.

DESCRIPTION OF A PREFERRED EMBODIMENT

Figure 2:
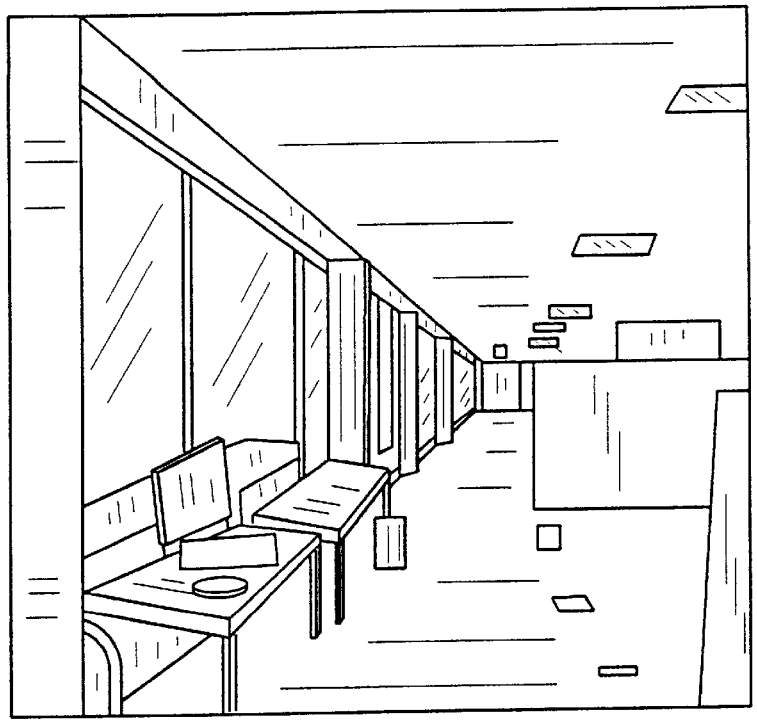
FIG. 2 is a representation of an actual scene viewed by a camera system of the apparatus.

Referring to the drawings, a video security system of the invention is indicated generally 10 in FIG. 1. The system employs one or more cameras C1-Cn each of which continually views a respective scene and produces a signal representative of the scene. The cameras may operate in the visual or infrared portions of the light spectrum and a video output signal of each camera is supplied to a processor means 12. Means 12 processes each received signal from a camera to produce an image represented by the signal and compares the image representing the scene at one point in time with a similar image of the scene at a previous point in time. The signal from the imaging means represented by the cameras may be either an analog or digital signal, and processing means 12 may be an analog, digital, or hybrid processor.

Figure 3:
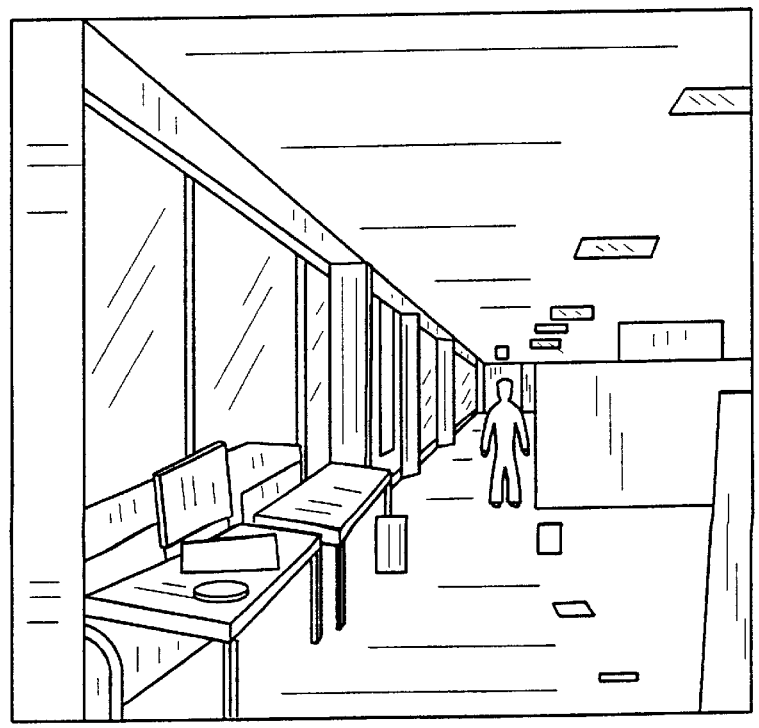
FIG. 3 is the same scene as FIG. 2 but with the presence of an intruder.
Figure 4:
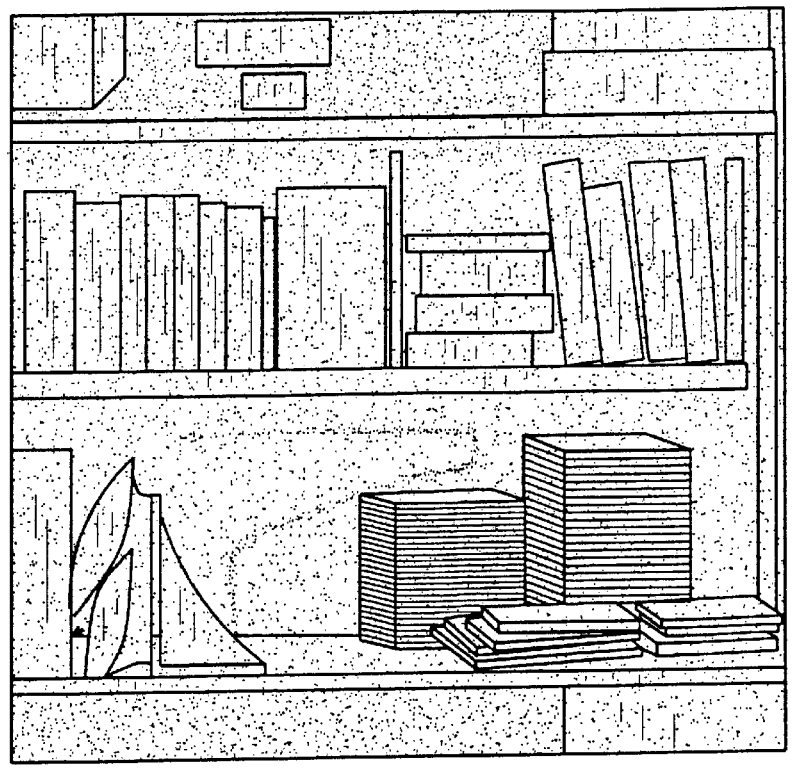
FIG. 4 is a representation of another actual scene under one lighting condition.

In FIG. 2, an image of a scene is shown, the representation being the actual image produced by a camera C. FIG. 2 represents, for example, a reference image of the scene. FIG. 3 is an image exactly the same as that in FIG. 2 except that now a person (human intruder) has been introduced into the scene. FIG. 3 is again an actual image produced by a camera C. Similarly, FIG. 4 represents a reference image of a scene, and FIG. 5 a later image in which there is a lighting change but not an intrusion. The system and method of the invention operate to identify the presence of such a human intruder and provide an appropriate alarm. However, it is also a principal feature of the invention to not produce false alarms. As described herein and in the referenced co-pending application, there a numerous sources of false alarms and using a series of algorithms employed by the invention, these sources are identified for what they are so no false alarms are given.

Figure 5:
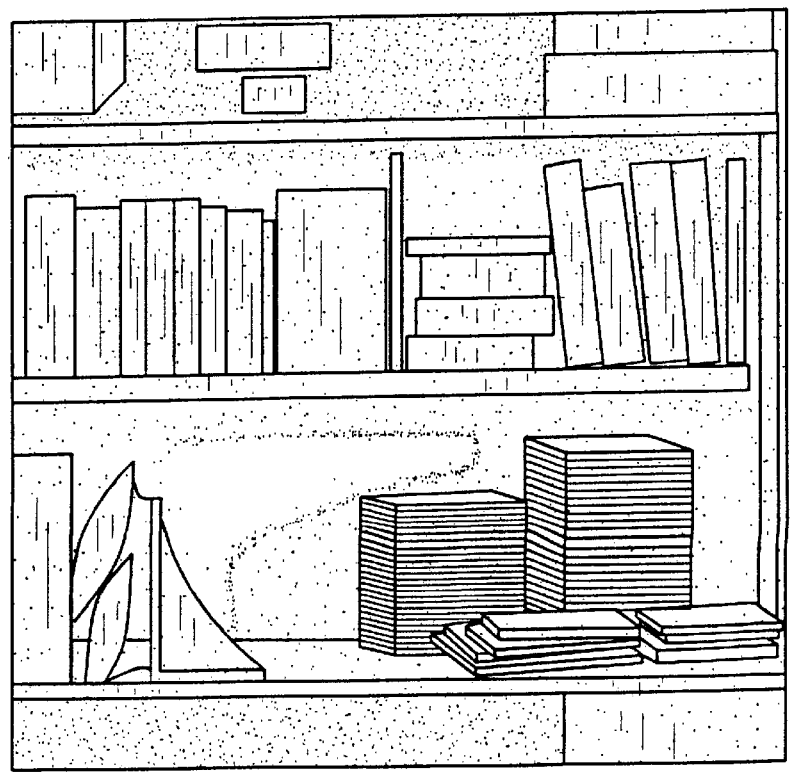
FIG. 5 is a representation of the same scene under different lighting conditions and with no intruder in the scene.

Operation of the invention is such that segments of an image (FIG. 3, FIG. 5) which differ from segments of an earlier image (FIG. 2, FIG. 4) are identified. A discriminator means 14 evaluates those segments to determine if the differences are caused by a local lighting change within the scene (FIG. 5), or the movement of an intruder within the scene (FIG. 3). As noted, if the change is caused by an intruder, an alarm is given. But, if the differences result from global or local lighting changes, the effects of motion of objects established within the scene, noise, and aliasing effects, these are recognized as such so false alarm is not given. Detection of local lighting changes such as shown in FIG. 5 are described in the referenced co-pending application.

Generally, a single processor can handle several cameras positioned at different locations within a protected site. In use, the processor cycles through the different cameras, visiting each at a predetermined interval. At system power-up, the processor cycles through all of the cameras doing a self-test on each. One important test at this time is to record a reference frame against which later frames will be compared. A histogram of pixel values is formed from this reference frame. If the histogram is too narrow, a message is sent to the effect that this camera is obscured and will not used. This is done to guard against the possibility of someone obscuring the camera while it is off by physically blocking the lens with an object or by spray-painting it. If a camera is so obscured, then all the pixel values will be very nearly the same and this will show up in the histogram. Although the camera is now prevented from participating in the security system, the system operator is informed that something is amiss at that particular location so the problem can be investigated.

In accordance with the method, a reference frame f1 is created. Throughout the monitoring operation, this reference frame is continuously updated if there is no perceived motion within the latest image against which a reference image is compared. At each subsequent visit to the camera a new frame f2 is produced and subtracted from the reference. If the difference is not significant, the system goes on to the next camera. However, if there is a difference, frame f2 is stored and a third frame f3 is created on the next visit and compared to both frames f1 and f2. Only if there is a significant difference between frames f3 and f2 and also frames f3 and f1, is further processing done. This three frame procedure eliminates false alarms resulting from sudden, global light changes such as caused by lightning flashes or interior lights going on or off. A lightning flash occurring during frame f2 will be gone by frame f3, so there will be no significant difference between frame f3 and f1. On the other hand, if the interior lights have simply gone on or off between frames f1 and f2, there will be no significant changes between frames f2 and f3. In either instance, the system proceeds on to the next camera with no more processing. Significant differences between frames f1 and f2, frames f3 and f2, and frames f3 and f1 indicate a possible intrusion requiring more processing.

Figure 8:
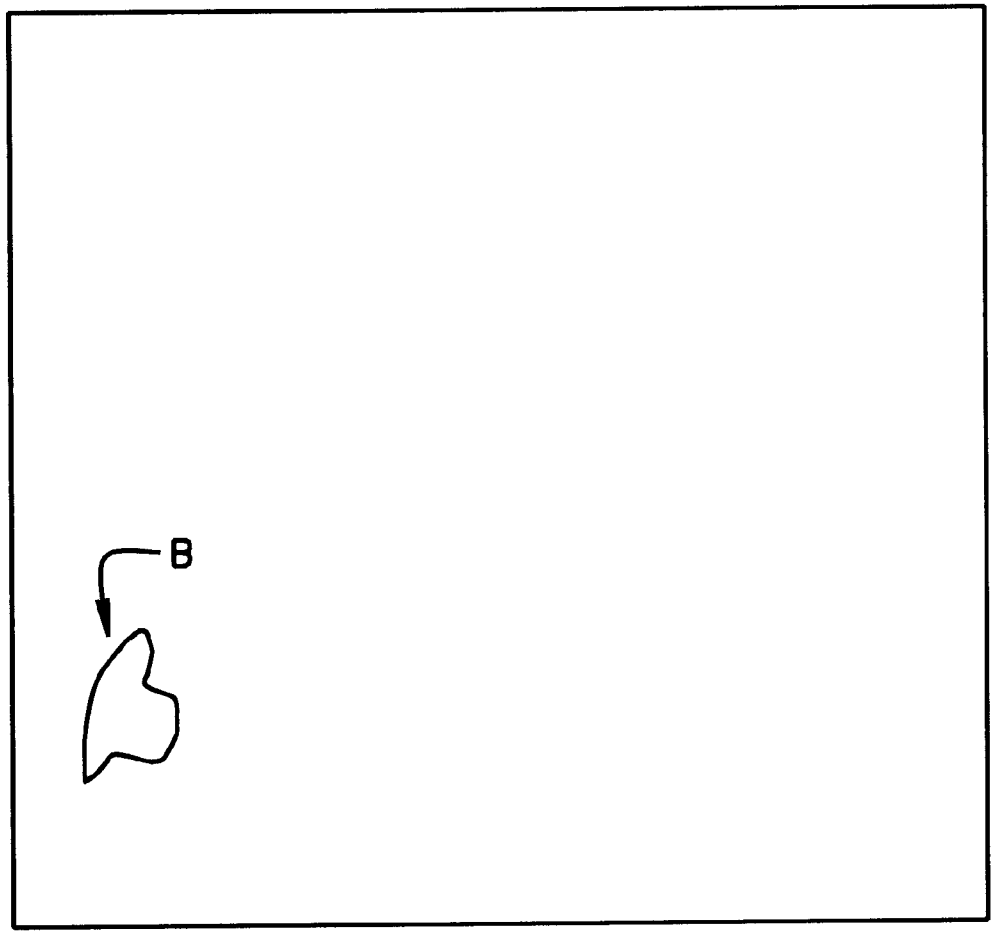
FIG. 8 illustrates masking of an image for those areas within a scene where fixed objects having an associated movement or lighting change are located.

Besides global lighting changes occurring between the images, non-intruder motion occurring within the scene is also identified so as not to trigger processing or cause false alarms. Thus, for example, if the fan shown in the lower left portion of FIGS. 4 and 5 were running, movement of the fan blades would also appear as a change from one image to another. Similarly, if the fan is an oscillating fan, its sweeping movement would also be detected as a difference from one image to another. As described hereinafter, and as shown in FIG. 8, the area within the scene where an object having an associated movement is generally fixed and its movement is spatially constrained movement, the area where this movement occurs is identified and masked so, in most instances, motion effects resulting from operation of the object (fan) are disregarded. Although, if the motion of an intruder overlaps the masked area, the difference from one image to another is identified and further processing, including the normally masked area takes place. It will be understood that there are a variety of such sources of apparent motion which are identified and masked. Besides the fan, there are clocks both digital and those having hands. In one instance, the numerical display of time changes; in the other instance, the hands of the clock (particularly the second hand) has a noticeable movement. Computers with screen savers may have a constantly changing image on their monitors. In manufacturing areas, different pieces of equipment, rotating or reciprocal machinery, robotic arms, etc., all exhibit movements which can be identified and accounted for during processing.

Any video alert system which uses frame-to-frame changes in the video to detect intrusions into a secured area is also vulnerable to false alarms from the inadvertent (passing automobile lights, etc.) or deliberate (police or security guard flashlights) introduction of light into the area, even though no one has physically entered the area. The system and method of the invention differentiate between a change in a video frame due to a change in the irradiation of the surfaces in the FOV (field of view) as in FIG. 5, and a change due to the introduction of a new reflecting surface in the FOV as in FIG. 3. The former is then rejected as a light "intrusion" requiring no alarm, whereas the latter is identified as a human intruder for which an alarm is given. It is important to remember that only the presence of a human intruder is of consequence to the security system, everything else constitutes a false alarm. It is the capability of the system and method of the invention to yield a high probability of detection of the presence of a human, while having a low probability of false alarms which constitutes a technically differentiated video security system. The video processing means of the present invention can also defeat the artifacts of noise, aliasing, screen savers, oscillating fans, drapery blown by air flow through vents, etc.

ALGORITHM PROCESS STEPS

The complete algorithm processes that are implemented by the method of the present invention are as follows:

Antialiasing;

Detection (Differencing and Thresholding)

Outlining;

Region Grower Segmentation;

Noise removal;

Shadow removal;

Tests for global and local lighting changes;

Masking;

Shape features;

Fourier Descriptors;

Object classification

The portion of the algorithm addressing testing for localized light changes is described in the referenced co-pending application. The detection, antialiasing, region grower segmentation, noise removal, global lighting changes and masking algorithms of the method are addressed in this application. The other portions of the algorithm which relate to classification of an intruder as a human or non-human lifeform are described in co-pending application Ser. No. 08/771,991.

ANTIALIASING PROCESS

The alias process is caused by sampling at or near the intrinsic resolution of the system. As the system is sampled at or near the Nyquist frequency, the video, on a frame by frame basis, appears to scintillate, and certain areas will produce Moire-like effects. Subtraction on a frame by frame basis would cause multiple detections on scenes that are unchanging. In many applications where this occurs it is not economically possible to over sample. Elimination of aliasing effects is accomplished by convolving the image with an equivalent two-dimensional (2D) smoothing filter. Whether this is a 3×3 or 5×5 filter, or a higher filter, is a matter of preference as are the weights of the filter.

DETECTION PROCESS

The detection process consists of comparing the current image to a reference image. To initialize the system it is assumed that the operator has control over the scene and, therefore, will select a single frame for the reference when there is nothing present. (If necessary, up to 60 successive frames can be selected and integrated together to obtain an averaged reference image). As shown in FIG. 1, apparatus 10 employs multiple cameras C1-Cn, but the methodology with respect to one camera is applicable for all cameras. For each camera, an image is periodically selected and the absolute difference between the current image (suitably convolved with the antialiasing filter) and the reference is determined. The difference image is then thresholded (an intensity threshold) and all of the pixels exceeding the threshold are accumulated. This step eliminates a significant number of pixels that otherwise would result in a non-zero result simply by differencing the two images. Making this threshold value adaptive within a given range of threshold values ensures consistent performance. If the count of the pixels exceeding the intensity threshold exceeds a pixel count threshold, then a potential detection has occurred. At this time, all connected hit pixels (pixels that exceed the intensity threshold) are segmented, and a count of each segmented object is taken. If the pixel count of any object exceeds another pixel count threshold, then a detection is declared. Accordingly, detection is defined as the total number of hit pixels in the absolute difference image being large and there is a large connected object in the absolute difference image.

With respect to noise, the key to rejecting noise induced artifacts is their size. Noise induced detections are generally spatially small and distributed randomly throughout the image. The basis for removing these events is to ascertain the size (area) of connected pixels that exceed the threshold set for detection. To achieve this, the region where the detected pixels occur is grown into connected "blobs". This is done by region growing the blobs. After region growing, those blobs that are smaller in size than a given size threshold are removed as false alarms.

REGION GROWER SEGMENTATION

Typically, a region growing algorithm starts with a search for the first object pixel as the outlining algorithm does. Since searching and outlining has already been performed, and since the outline pixels are part of the segmented object, these do not need to be region grown again. Outline pixel arrays are now placed on a stack, and the outline pixels are zeroed out in the absolute difference image. A pixel is then selected (removed from the stack) and the outline pixels are zeroed out in the absolute difference image. The selected pixel P and all of its eight neighbors P1-P8 (see FIG. 7) are examined to see if hit points occur (i.e. they are non-zero). If a neighbor pixel is non-zero, then it is added to the stack and zeroed out in the absolute difference image. Note that for region growing, all eight neighboring pixels are examined, whereas in outlining, the examination of neighboring pixels stops as soon as an edge pixel is found. Thus, in outlining, as few as one neighbor may be investigated. The region growing segmentation process stops once the stack is empty. Now, those areas too small to be of interest are eradicated, and the light change and retinex tests described in co-pending application Ser. No. 08/772,595 are performed. The result is that substantially all false alarms induced by noise and lighting effects are eliminated. What remains is a class of objects which are apparently stationary, but on a frame by frame analysis, give the appearance of motion. Because these objects are stationary from the standpoint of determining an intrusion, false alarms which might be caused because of them are eliminated by masking the image. That is, as shown in FIG. 8. The total block B of connected pixels defining the object are constrained within a mask of the image. It will be understood that there may be more than one masked object within a scene. Because the object is not considered a real object, it is not now considered in the next stage of processing, i.e. object recognition or classification as described in co-pending application Ser. No. 08/771,991.

Finally, it is important to recognize significance in the order of processing. That is, should the region grower grow an object beyond the boundaries defined by a mask, then the whole of the object, including that portion within the mask is considered worthy of further processing. Thus, for example, were there an overlap between an intruder and a masked area, the entire area will be further examined.

What has been described is a video security system and method of image processing which is responsive to the presence of anomalies or artifacts which result when two images (an earlier and a later image) of a scene are compared. Since the main purpose of the system and method is to detect the presence of a human intruder and not just to recognize that there are differences between the images, the method of the invention employs an algorithm which employs retinex and edge mapping techniques to detect and outline segments of the image where there is an anomaly, but to then also identify those anomalies which are artifacts of various causes which are not a human intruder so possible false alarms which otherwise could result from these sources are rejected.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by letters patent is:

1. A method of evaluating a scene to determine if an perceived movement within the scene is caused by an intruder into the scene comprising:

viewing the scene and creating an image of the scene comprising a plurality of pixels arranged in an array;

comparing the image of the scene with a reference image thereof to produce a difference image, producing said difference image including convolving the image with an antialiasing means to eliminate any aliasing effects in the difference image, outlining any segments where possible movement has occurred, determining a ratio of light intensity between each pixel in a segment with each pixel adjacent thereto, and comparing the ratio values for the pixels in a segment of one image with the ratio values for the pixels in the corresponding segment of another image to eliminate the effects of lighting changes;

processing the difference image to identify any segments therewithin which, based upon a first predetermined set of criteria, represent spatially constrained movements of an object fixed within the scene, and further processing the difference image to identify any segments therewithin which, based upon a second predetermined set of criteria, represent artifacts not caused by the presence of an intruder within the scene, said segments meeting said first and second sets of criteria being identified as segments not requiring further processing; and, further processing those segments within the difference image which remain to determine if movement therewithin is caused by an intruder.

2. The method of claim 1 wherein viewing the scene includes continually viewing the scene with a camera producing a two-dimensional image of the scene.

3. The method of claim 1 wherein processing said difference image includes region growing the segments within the difference image.

4. The method of claim 3 wherein processing said difference image in accordance with said second predetermined set of criteria further includes determining if each region grown segment within the image in which an artifact occurs is less than a predetermined size, and identifying those segments whose size is less than the predetermined size as resulting from such causes as noise or lighting effects, and not as the result of an intruder.

5. The method of claim 1 wherein processing the difference image and identifying segments therewithin representing spatially constrained movements of an object fixed within the scene further includes masking those segments within the scene in which said movements are confined.

6. The method of claim 5 further including processing those masked segments in the scene when a segment in which an intruder may be present overlaps a boundary of a masked segment, but to not otherwise process said masked segment.

7. The method of claim 1 wherein further including determining if a computed ratio for one pixel and an adjacent pixel in one segment of an image differs by a predetermined threshold value from the computed ratio for the pixels in the corresponding segment of the other image.

8. The method of claim 7 wherein further including determining if the number of computed ratios for the pixels in the segment of the one image compared with the computed ratio for the pixels in the corresponding segment of the other image exceed a second threshold value, the result of the comparison, if exceeding the second threshold value, indicating that the difference between the images is the result of the presence of an intruder introduced into the scene.

9. The method of claim 1 further including updating the reference image of the scene if the comparison of an image with a reference image reveals no possible motion within the scene has occurred.

* * * * *